United States Patent
Huang

(10) Patent No.: US 9,722,730 B1
(45) Date of Patent: Aug. 1, 2017

(54) MULTI-STREAM DEMODULATION SCHEMES WITH PROGRESSIVE OPTIMIZATION

(71) Applicant: Marvell International Ltd., Hamilton (BM)

(72) Inventor: Jie Huang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/041,774

(22) Filed: Feb. 11, 2016

Related U.S. Application Data

(60) Provisional application No. 62/115,355, filed on Feb. 12, 2015.

(51) Int. Cl.
| | | |
|---|---|---|
| *H04L 1/02* | (2006.01) | |
| *H04L 1/00* | (2006.01) | |
| *H04B 7/0456* | (2017.01) | |

(52) U.S. Cl.
CPC ......... *H04L 1/0054* (2013.01); *H04B 7/0456* (2013.01)

(58) Field of Classification Search
CPC ........ H04L 1/0618; H04L 1/06; H04B 7/0413
USPC ................ 375/267, 130, 260, 299, 340, 347
See application file for complete search history.

(56) References Cited

U.S. PATENT DOCUMENTS

| | | | |
|---|---|---|---|
| 7,206,354 B2 | 4/2007 | Wallace et al. | |
| 7,469,014 B2 | 12/2008 | Abe et al. | |
| 7,486,740 B2 | 2/2009 | Inanoglu | |
| 7,489,746 B1 | 2/2009 | Awater et al. | |
| 7,583,763 B2 | 9/2009 | Nissani (Nissensohn) et al. | |
| 7,729,439 B2 | 6/2010 | Zhang et al. | |
| 8,054,909 B2 | 11/2011 | Bahng et al. | |
| 8,073,069 B2 | 12/2011 | Mundarath et al. | |
| 8,135,098 B2 | 3/2012 | Lee et al. | |
| 8,155,233 B1 | 4/2012 | Lee et al. | |

(Continued)

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Khai Tran

(57) ABSTRACT

A data symbol vector comprising a plurality of data symbols is received. The data symbol vector corresponds to a transmitted data symbol vector comprising a corresponding plurality of transmitted data symbols. Data values are estimated for transmitted data symbols in a first group of transmitted data symbols using a hard-decision technique. One or more iterations of refining estimated data values for at least one of the transmitted data symbols in the first group are performed based on estimated data values for the other one or more transmitted data symbols in the first group. Likelihood values for bits corresponding to transmitted data symbols in a second group of transmitted data symbols are calculated using a soft maximum-likelihood (ML) technique based on the estimated and refined data values of transmitted data symbols in the first group.

22 Claims, 5 Drawing Sheets

(56) References Cited

U.S. PATENT DOCUMENTS

| | | |
|---|---|---|
| 8,238,488 B1 | 8/2012 | Lee et al. |
| 8,243,860 B1 | 8/2012 | Lee et al. |
| 8,270,909 B2 | 9/2012 | Zhang et al. |
| 8,331,475 B1 | 12/2012 | Palanivelu et al. |
| 8,351,549 B1 | 1/2013 | Choi et al. |
| 8,401,127 B1 | 3/2013 | Lee et al. |
| 8,411,806 B1 | 4/2013 | Lee et al. |
| 8,437,434 B1 | 5/2013 | Lee et al. |
| 8,559,543 B1 | 10/2013 | Lee et al. |
| 8,711,989 B1 | 4/2014 | Lee et al. |
| 8,718,204 B1 | 5/2014 | Lee et al. |
| 8,724,720 B2 | 5/2014 | Srinivasa et al. |
| 8,903,025 B1 | 12/2014 | Chandrasekar et al. |
| 8,923,217 B2 | 12/2014 | Liu et al. |
| 8,958,503 B1 * | 2/2015 | Nabar ............... H04L 25/0204 375/260 |
| 8,995,584 B1 | 3/2015 | Choi et al. |
| 9,071,295 B1 | 6/2015 | Lee et al. |
| 9,094,063 B1 | 7/2015 | Lee et al. |
| 9,252,991 B2 | 2/2016 | Zhang |
| 2002/0150187 A1 | 10/2002 | Chugg et al. |
| 2003/0125040 A1 | 7/2003 | Walton et al. |
| 2005/0002359 A1 | 1/2005 | Kim |
| 2005/0018789 A1 | 1/2005 | Jia et al. |
| 2005/0025039 A1 | 2/2005 | Hwang et al. |
| 2005/0053172 A1 | 3/2005 | Heikkila |
| 2005/0101259 A1 | 5/2005 | Tong et al. |
| 2005/0201478 A1 | 9/2005 | Claussen et al. |
| 2005/0259771 A1 | 11/2005 | Higuchi et al. |
| 2005/0286462 A1 | 12/2005 | Roh et al. |
| 2006/0056550 A1 | 3/2006 | Skraparlis et al. |
| 2006/0109897 A1 | 5/2006 | Guo et al. |
| 2006/0198460 A1 | 9/2006 | Airy et al. |
| 2006/0209994 A1 | 9/2006 | Graef et al. |
| 2006/0269023 A1 | 11/2006 | Chimitt et al. |
| 2007/0127589 A1 | 6/2007 | Hwang et al. |
| 2007/0135125 A1 | 6/2007 | Kim et al. |
| 2007/0165737 A1 | 7/2007 | Sarrigeorgidis |
| 2007/0183541 A1 | 8/2007 | Moorti et al. |
| 2007/0197166 A1 | 8/2007 | Kawamoto et al. |
| 2007/0211813 A1 | 9/2007 | Talwar et al. |
| 2007/0229329 A1 | 10/2007 | Maru |
| 2007/0230608 A1 | 10/2007 | Li |
| 2008/0025442 A1 | 1/2008 | Hwang et al. |
| 2008/0095257 A1 | 4/2008 | Maeda et al. |
| 2008/0239938 A1 | 10/2008 | Jalloul et al. |
| 2009/0060078 A1 | 3/2009 | van Zelst et al. |
| 2009/0316803 A1 | 12/2009 | Paker et al. |
| 2010/0086067 A1 | 4/2010 | Oka |
| 2011/0051832 A1 | 3/2011 | Mergen et al. |
| 2013/0229996 A1 | 9/2013 | Wang et al. |
| 2015/0131517 A1 | 5/2015 | Chu et al. |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Chen, "Home Network Basis: Transmission Environments and Wired/Wireless Protocols," Prentice Hall, pp. 1-26 (Jul. 2003).

Chun et al., "Legacy Support on HEW frame structure," doc: IEEE 11-13/1057r0, the Institute of Electrical and Electronics Engineers, Inc., pp. 1-8 (Sep. 2013).

Ghaffar et al., "Low Complexity BICM Demodulation for MIMO Transmission," 2008 IEEE 9th Workshop on Signal Processing Advances in Wireless Communications, pp. 396-400 (Jul. 2008).

Hiertz et al., "The IEEE 802.11 Universe," IEEE Communications Magazine, pp. 62-70, (Jan. 2010).

Love et al., "An Overview of Limited Feedback in Wireless Communication Systems," IEEE J. on Selected Areas in Communications, vol. 26, No. 8, pp. 1341-1365 (Oct. 2008).

Seok et al., "HEW PPDU Format for Supporting MIMO-OFDMA," IEEE 802.11-14/1210r0, 16 pages, (Sep. 14, 2014).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Zheng et al., "Link Performance Abstraction ofr ML Receivers based on RBIR Metrics," IEEE 802.16 Broadband Wireless Access Working Group, 18 pages (Sep. 10, 2007).

U.S. Appl. No. 15/041,790, Huang, "Data Demodulation Using Bit Separating and Metric Cross Update," filed Feb. 11, 2016.

Office Action in U.S. Appl. No. 15/041,790, mailed May 5, 2017 (19 pages).

* cited by examiner

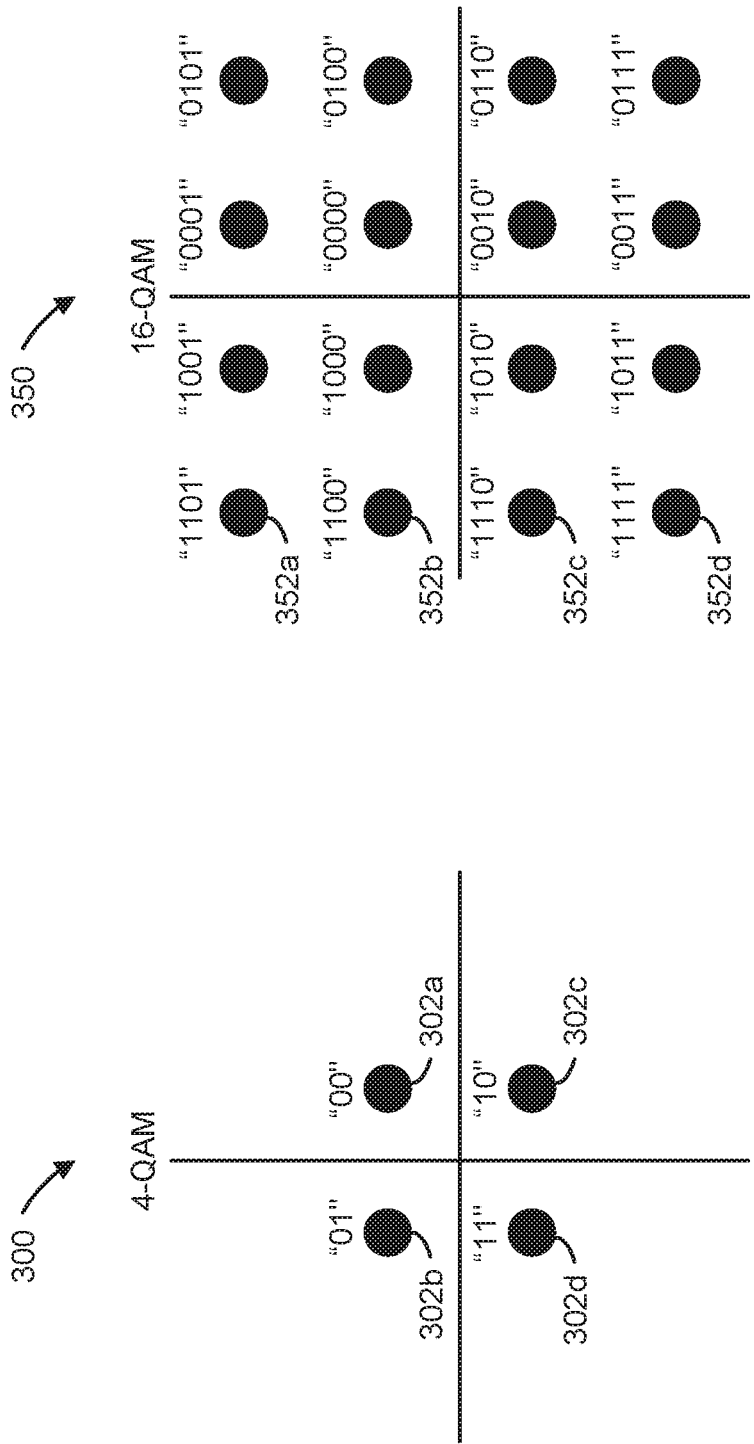

MULTI-STREAM DEMODULATION SCHEMES WITH PROGRESSIVE OPTIMIZATION

CROSS REFERENCE TO RELATED APPLICATION

This application claims the benefit of U.S. Provisional Patent App. No. 62/115,355 entitled "Novel ML Algorithms Using Progressive Optimization in Multiple-Stream MIMO Systems," filed on Feb. 12, 2015, the disclosure of which is hereby expressly incorporated herein by reference in its entirety.

Additionally, this application is related to U.S. patent application Ser. No. 15/041,790, entitled "Data Demodulation using Bit Separating and Metric Cross Update," filed on the same day as the present application, the disclosure of which is hereby expressly incorporated herein by reference in its entirety.

FIELD OF TECHNOLOGY

The present disclosure relates generally to multi-antenna wireless systems and, more particularly, to multi-stream soft demodulation using hard decisions.

BACKGROUND

In some wireless communication systems, one or more communication devices employ multiple antennas. Accordingly, a communication channel between two such devices can be a multiple-input, multiple-output (MIMO) channel when both communication devices employ multiple antennas, a single-input, multiple-output (SIMO) channel when a transmitting device ("the transmitter") employs a single transmit antenna and the receiving device ("the receiver") employs multiple receive antennas, or a multiple-input, single-output (MISO) channel the transmitter employs multiple transmit antennas and the receiver employs a single receive antenna.

The communication devices in the wireless communication systems may be capable of using a variety of modulation schemes. For example, some modulations schemes may provide a higher bit rate than other schemes (e.g., 256-QAM vs. 64-QAM). Different modulation/demodulation schemes have various degrees of complexity, and complexity of a given demodulation technique may affect the complexity of a receiver. Higher complexity of a demodulation technique generally requires more complexity on the receiver, e.g., more, larger, and/or more expensive processing modules and/or components. Higher complexity of a demodulation technique may also lead to an increase in processing time and an increase in power consumption.

SUMMARY

In an embodiment, a method for communicating in a wireless communication network includes receiving, at a communication device, a data symbol vector comprising a plurality of data symbols that are received at substantially the same time, wherein the data symbol vector corresponds to a transmitted data symbol vector comprising a plurality of transmitted data symbols corresponding to the plurality of data symbols. The method also includes estimating, at the communication device, data values for transmitted data symbols in a first group of two or more transmitted data symbols using a hard-decision technique, including performing one or more iterations of refining estimated data values for at least one of the transmitted data symbols in the first group of two or more transmitted data symbols based on estimated data values for the other one or more transmitted data symbols in the first group of two or more transmitted symbols. The method additionally includes calculating, at the communication device, likelihood values for bits corresponding to transmitted data symbols in a second group of transmitted data symbols using a soft maximum-likelihood (ML) technique based on the estimated data values of transmitted data symbols in the first group of transmitted data symbols, wherein the first group of transmitted data symbols does not overlap with the second group of transmitted symbols.

In another embodiment, an apparatus for communicating in a wireless communication network comprising one or more integrated circuits configured to receive a data symbol vector comprising a plurality of data symbols that are received at substantially the same time, wherein the data symbol vector corresponds to a transmitted data symbol vector comprising a plurality of transmitted data symbols correspond to the plurality of data symbols. The one or more integrated circuits are further configured to estimate data values for transmitted data symbols in a first group of two or more transmitted data symbols using a hard-decision technique, including performing one or more iterations of refining estimated data values for at least one of the transmitted data symbols in the first group of two or more transmitted data symbols based on estimated data values for the other one or more transmitted data symbols in the first group of two or more transmitted symbols. The one or more integrated circuits are additionally configured to calculate likelihood values for bits in a second group of transmitted data symbols using a soft maximum-likelihood (ML) technique based on the estimated data values of transmitted data symbols in the first group of transmitted data symbols, wherein the first group of transmitted data symbols does not overlap with the second group of transmitted symbols.

BRIEF DESCRIPTION OF THE DRAWINGS

FIG. 3A is an example constellation set for a 4-QAM scheme, according to an embodiment;

FIG. 3B is an example constellation set for a 16-QAM scheme, according to an embodiment;

DETAILED DESCRIPTION

While the demodulation schemes described herein are described as being used in communication systems that use one of the IEEE Standard 802.11 communication standards (e.g., IEEE 802.11ac Standard), these techniques may be used in various other types of wireless communication systems and are not limited to those conforming to one or more of the IEEE Standard 802.11 standards. For example, these techniques may be used in communication systems based on the IEEE 802.16e, 802.16j, or 802.16m standards (known as "WiMAX"), mobile telephony communication systems, etc.

Figure 1:
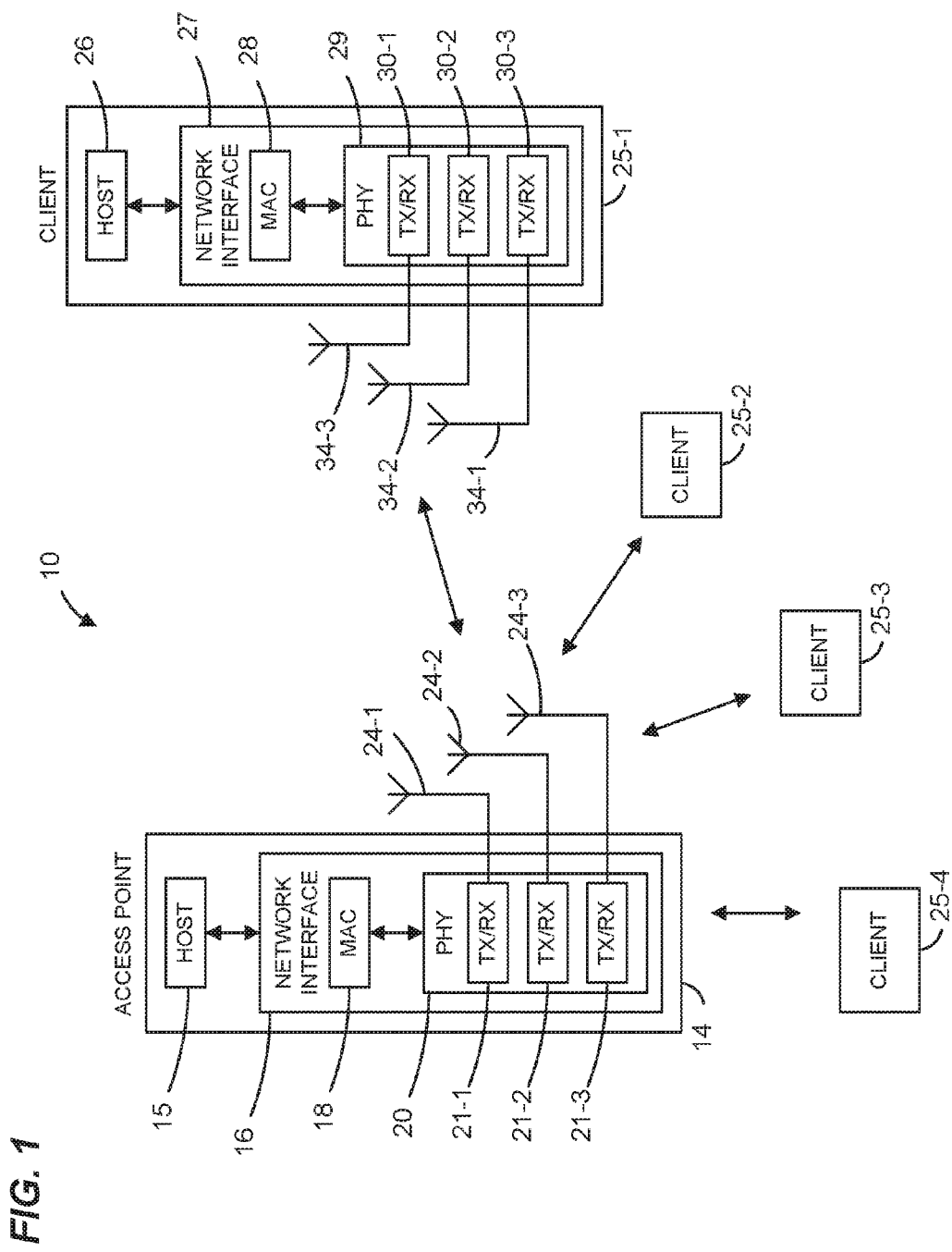
FIG. 1 is a block diagram of an example wireless local area network (WLAN), according to an embodiment.

FIG. 1 is a block diagram of an example wireless local area network (WLAN) 10, according to an embodiment. An access point (AP) 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PITY processor 20 are implemented on a single IC.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

In an embodiment, one or more of the client stations 25-2, 21-3, and 25-4 has a structure that is the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

Different numbers of spatial streams are transmitted between the antennas 24 and antennas 34 in various embodiments and/or configurations. Typically, the number S of spatial streams associated with a communication channel between a transmitting device (e.g., the AP 14) and a receiving device (e.g., the client station 25) is less than or equal to minimum of the number $N_T$ of transmit antennas (e.g., antennas 24) and the number $N_R$ of receive antennas (e.g., antennas 34) at the receiving device (i.e., $N_S \leq \min(N_T, N_R)$). The spatial streams are defined in various ways, e.g., according to various multiple-input and multiple-output (MIMO) modes or schemes, in various embodiments and/or scenarios. For example, the AP 14 uses the antennas 24 to improve channel diversity by transmitting multiple copies of the same symbol via several streams, in an embodiment and/or scenario. Alternatively, the AP 14 transmits different symbols via each of the antennas 24 to increase throughput, in an embodiment and/or scenario. As yet another alternative, the AP 14 operates in a mixed MIMO mode to improve both channel diversity and throughput, in an embodiment and/or scenario.

In various embodiments, a transmitting device (e.g., the AP 14) and a receiving device (e.g., the client station 25) communicate using a single frequency or multiple frequencies. In an embodiment in which the transmitting device and the receiving device communicate using multiple frequencies, the communication channel between the transmitting device and the receiving includes multiple carriers or sub-carriers, each associated with a particular frequency. In some embodiments, the WLAN 10 uses an OFDM technique, and the subcarriers are selected to be mutually orthogonal (i.e., to minimize cross-talk between each pair of subcarriers). However, the WLAN 10 uses other frequency division multiplexing technique, in other embodiments.

Figure 2A:
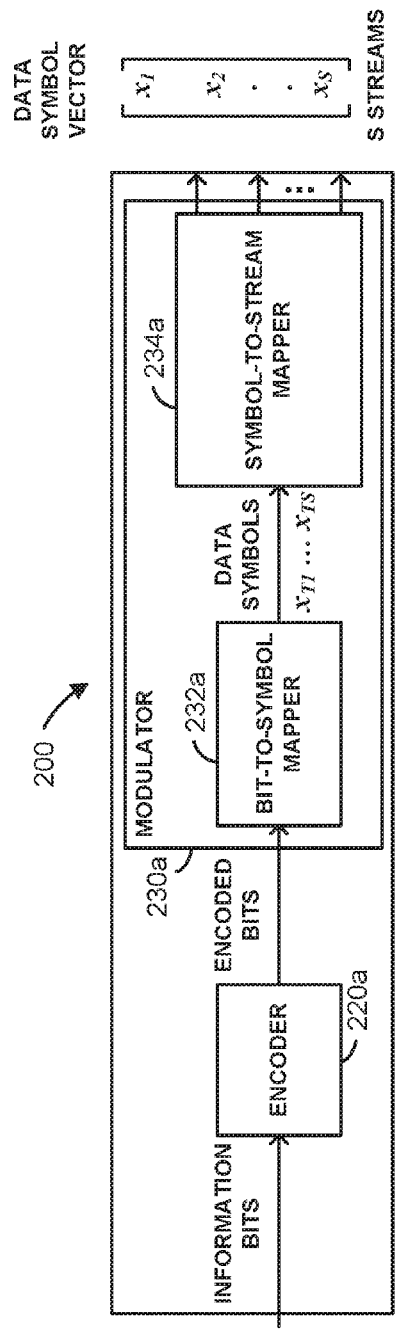
FIG. 2A is a block diagram of an example transmit processor, according to an embodiment.
Figure 2B:
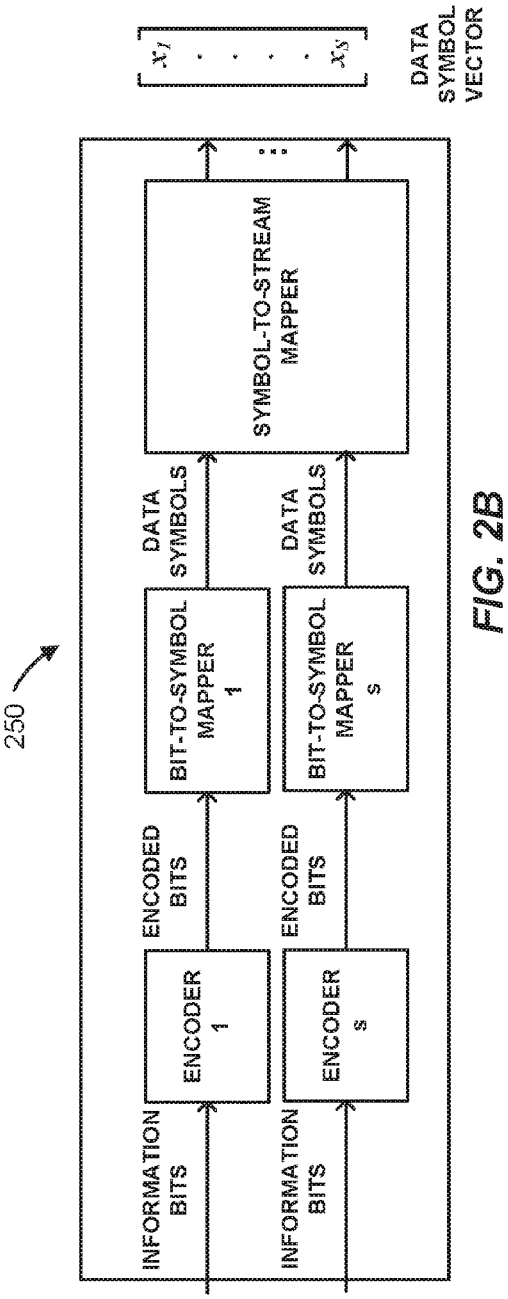
FIG. 2B is a block diagram of another example transmit processor, according to another embodiment.

FIGS. 2A-2B are block diagrams of example transmit processors 200, 250 according to embodiments. In various embodiments, AP 14 includes a transmit processor such as the transmit processor 200 or the transmit processor 250. For example, the PHY processor 20 includes a transmit processor such as the transmit processor 200 or the transmit processor 250, in various embodiments. Similarly, a client station (e.g., the client station 25) includes a transmit processor such as the transmit processor 200 or the transmit processor 250, in various embodiments. For example, the PHY processor 29 includes a transmit processor such as the transmit processor 200 or the transmit processor 250, in various embodiments. In other embodiments, a transmit processor such as the transmit processor 200 or the transmit processor 250 is included in other suitable communication devices.

Referring to FIG. 2A, the transmit processor 200 generally converts a sequence of information bits into signals appropriate for transmission through a communication channel. In an embodiment, the transmit processor 200 includes an encoder 220 (e.g., a convolution encoder) that encodes information bits, and a modulator 230 that modulates the encoded bits into bit sequences referred to as "data symbols," which are mapped and converted to signals appropriate for transmission via transmit antennas. In at least some embodiments, the transmit processor 200 includes various additional modules that, for ease of explanation, are not shown in FIG. 2A. For example, the transmit processor 200 includes an interleaver that interleaves the encoded bits to mitigate burst errors, in some embodiments. In some embodiments, the transmit processor 200 further includes an analog radio frequency (RF) front end for performing frequency upconversion, various filters, power amplifiers, and so on.

The modulator 230 includes a bit-to-symbol mapper 232 that maps encoded bits into multiple data symbols, and a symbol-to-stream mapper 234 that maps the multiple data symbols into multiple parallel data streams, in an embodiment. In an embodiment, the modulator 230 generates S parallel data streams that are represented by a data symbol vector $x=[x_1, x_2, \ldots, x_S]$. Each individual symbol $x_s$ in the data symbol vector x is a symbol representative of W bits $(b_{s,1}, b_{s,2}, \ldots, b_{s,W})$, in an embodiment. Accordingly, a given bit $b_{s,n}$ is the n-th bit in a data symbol of the s-th stream, in this embodiment.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, has a number of associated symbols and vice versa, in some embodiments. It should be further understood that, in some embodiments, the same symbol is transmitted on multiple streams.

In some embodiments, the modulator 230 uses quadrature amplitude modulation (QAM) to map bits to symbols in a QAM signal constellation set, where the symbols are differentiated from one another by phase and/or magnitude. For example, FIG. 3A illustrates a 4-QAM constellation set 300 in an in phase (I) and quadrature phase (Q) plane. In this case, constellation points 302a-302d are distinguishable only by phase. Each constellation point 302 represents a different two-bit symbol. For example, the constellation point 302a represents "00," the constellation point 302b represents "01," the constellation point 302c represents "10," and the constellation point 302d represents "11," in the illustrated embodiment. Other bit to symbol mappings are utilized in other embodiments.

Similarly, FIG. 3B illustrates a 16-QAM constellation set 350, where four-bit sequences correspond to symbols. Here, both the amplitude and the phase of constellation points 352 vary. FIG. 3B illustrates a mapping, where each constellation point 354 represents a different four-bit symbol. For example, in the illustrated embodiment, the constellation point 352a represents "1101," the constellation point 304b represents "1100," the constellation point 352c represents "1110," the constellation point 352d represents "1111," and so on. However, as discussed in reference to FIG. 3A, other mappings are used in other embodiments.

In general, a W-bit symbol $x_s$ is mapped according to an M-QAM signal set, where $M=2^W$. Thus, for example, as illustrated in FIG. 3A, in an embodiment in which the modulator 230 uses the 4-QAM modulation scheme, or a quadrature phase-shift keying (QPSK) modulation scheme, the modulator 230 has a signal alphabet size of $M=2^2=4$ (i.e., 4 constellation points), and maps 2-bit pairs into the 4 constellation points. As another example, in an embodiment and/or scenario in which the modulator 230 uses a 64-QAM scheme, the modulator 230 has an alphabet size of $M=2^6=64$ (i.e., 64 constellation points) and maps 6-bit segments into the 64 constellation points. As yet another example, in an embodiment and/or scenario in which the modulator 230 uses a 256-QAM scheme, the modulator 230 has an alphabet size of $M=2^8=256$ (i.e., 256 constellation points) and maps 8-bit segments into the 256 constellation points. In other embodiments and/or scenarios, the modulator 230 uses other suitable modulation schemes. For example, the modulator 230 uses higher order QAM modulation schemes (e.g., 512-QAM, 1024-QAM, etc.), in some embodiments and/or scenarios. Accordingly, the modulator 230 has higher size alphabets (e.g., 512 constellation points, 1024 constellation points, etc.), and maps segments with higher numbers of bits (e.g., 9 bits, 10 bits, etc.) to the constellation points, in such embodiments and/or scenarios. In other embodiments and/or scenarios, the modulator 230 uses a lower order QAM modulation scheme (e.g., 64-QAM).

Referring again to FIG. 2A, although the transmit processor 200 includes a common encoder chain (an encoder 220, an interleaver (not shown), a modulator 230, etc.), a transmitting processor includes different encoder chains for different streams, in some embodiments. For example, as illustrated in FIG. 2B, each stream generated by the transmitting device 250 corresponds to a separate encoder chain. Other transmitting devices, such as those supporting the WiMAX standards, for example, support both a single-encoder option and a two-encoder option for a two-transmit-antenna configuration, in an embodiment. In general, the number of encoders and/or encoder chains is less than or equal to the number of transmitted streams S, in various embodiments.

Figure 4:
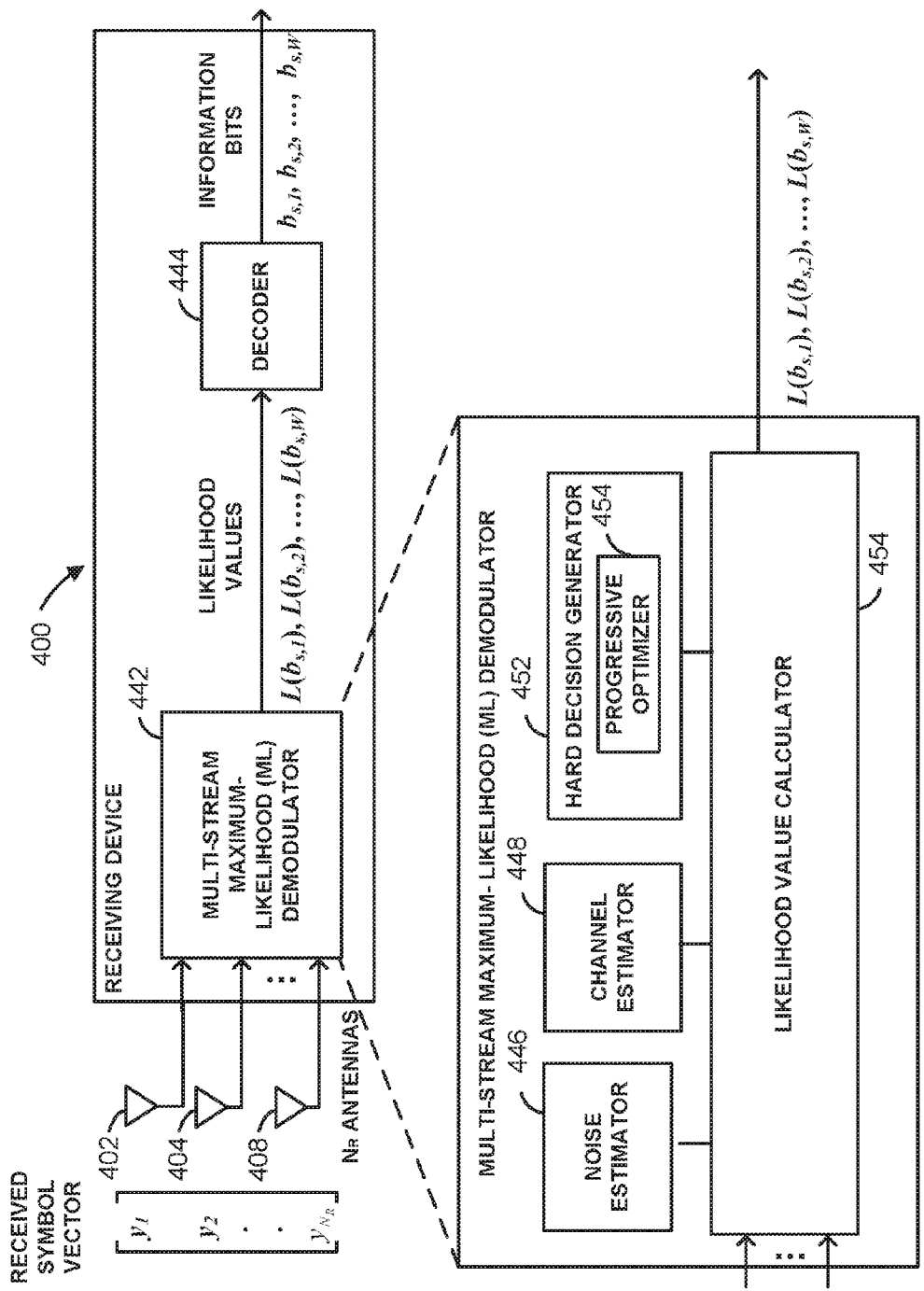
FIG. 4 is a block diagram of an example receive processor, according to an embodiment.

FIG. 4 is a block diagram of an example receive processor 400, according to an embodiment. In an embodiment, a client station (e.g., the client station 25-1) includes a receive processor such as the receive processor 400. For example, the PHY processor 29 includes a receive processor such as the receive processor 400, in an embodiment. Similarly, in an embodiment, the AP 14 includes a receive processor such as the receive processor 400. For example, the PHY processor 20 includes a receive processor such as the receive processor 400, in an embodiment. For example, the PHY processor 20 includes a receive processor such as the transmit processor 400, in an embodiment. In other embodiments, other suitable communication devices include receive processors such as the receive processor 400.

In an embodiment, the receive processor 400 demodulates and decodes signals from one or more transmitting devices using a multi-stream demodulation scheme. For example, in an embodiment, the receive processor 400 demodulates multiple streams generated by the transmit processor 200 of FIG. 2A or the transmit processor 250 of FIG. 2B or some other transmit processor, and transmitted by a transmitting device that includes the transmit processor 200 of FIG. 2A or the transmit processor 250 of FIG. 2B or some other transmit processor, in various embodiments.

In an embodiment, the receive processor 400 is coupled to multiple receive antennas (e.g., the antennas 34) and is configured to demodulate and decode information received via the multiple receive antennas to estimate the information that was sent by a transmitting device. In an embodiment, the receive processor 400 processes received information utilizing a model, such as:

$y=Hx+z$, where $$y = \begin{bmatrix} y_1 \\ y_2 \\ \vdots \\ y_{N_R} \end{bmatrix}; H = \begin{bmatrix} h_{1,1} & h_{1,2} & \cdots & h_{1,S} \\ h_{2,1} & h_{1,2} & \cdots & h_{2,S} \\ \vdots & \vdots & \vdots & \vdots \\ h_{N_R,1} & h_{N_R,2} & \cdots & h_{N_R,S} \end{bmatrix}; x = \begin{bmatrix} x_1 \\ x_2 \\ \vdots \\ x_{N_S} \end{bmatrix}; z = \begin{bmatrix} z_1 \\ z_2 \\ \vdots \\ z_{N_R} \end{bmatrix},$$

in which y represents, in vector from, a received signal, H represents a MIMO communication channel, x represents, in vector form, an estimated transmit signal, z represents a noise vector, and $N_R$ is the number of receive antennas. More precisely, $y_r$ is a received signal at antenna r, and $z_r$ is noise at an antenna r.

The MIMO communication channel H includes channel gain parameters $h_{r,s}$ representing channel gain in a stream s at a receive antenna r. In at least some of the embodiments, each channel gain $h_{r,s}$ is a complex number that incorporates an amplitude factor and a phase shift factor. In other words, each $h_{r,s}$ parameter may represent an attenuation coefficient associated with a certain propagation path as used in, for example, a Rayleigh fading channel model. In an embodiment, the receive processor 400 estimates the parameters $h_{r,s}$ and parameters associated with the noise z using any suitable technique.

With continued reference to FIG. 4, the receive processor 400 includes a multi-stream demodulator 442 and a decoder 444. In an embodiment, the multi-stream demodulator 442 calculates, based on the received symbols $y_1, y_2, \ldots, y_{N_R}$, likelihood values $L(b_{s,1})$, $L(b_{s,2})$, ..., $L(b_{s,W})$ of the transmitted bits $b_{s,1}, b_{s,2}, \ldots, b_{s,W}$ and provides the likelihood values $L(b_{s,1}), L(b_{s,2}), \ldots, L(b_{s,W})$ to the decoder 444. The decoder 444 uses the likelihood values $L(b_{s,1})$, $L(b_{s,2}), \ldots, L(b_{s,W})$ calculated by the multi-stream demodulator 442 to estimate the transmitted information bits $b_{s,1}$, $b_{s,2}, \ldots, b_{s,W}$, in an embodiment. Because the multi-stream demodulator 442 outputs likelihood values for bits, and not the bits themselves, the multi-stream demodulator 442 is called a "soft" demodulator. By contrast, demodulators that output bits are called "hard-decision demodulators," or simply "hard demodulators."

The multi-stream demodulator 442 includes a likelihood value calculator 454, a noise estimator 446, a channel estimator 448 and a hard decision generator 452 which, in turn, includes a progressive optimizer 454, in an embodiment. In an embodiment, the likelihood value calculator 454 is configured to calculate likelihood values $L(b_{s,1})$, $L(b_{s,2}), \ldots, L(b_{s,W})$. The channel estimator 448 is configured to estimate the MIMO communication channel H and the noise estimator 446 is configured to generate noise estimate information, including, for example, the variance of the noise $\sigma_z$, in an embodiment. The hard decision generator 452 is configured to performs various hard decision operations, such as symbol slicing operations (eg., QAM slicing), in an embodiment. The progressive optimizer 454 is configured to perform one or more iterations of refining hard decisions generated by the hard decision generator 452, as will be explained in more detail below, in an embodiment.

The multi-stream ML demodulator 442, in some embodiments, or in some modes of operation, includes one or more of the modules 446-454 or, alternatively, omits one or more of the processors 446-454 or does not use each of the processors 446-454 in demodulating the received signals. Further, in some embodiments, the multi-stream demodulator 442 and/or the receive processor 400 includes additional components and/or modules that, for ease of explanation, are not shown in FIG. 4. For example, in an embodiment, the receive processor 400 includes a linear equalizer, e.g., a zero-forcing equalizer, that is used by the multi-stream ML demodulator 442 to estimate the transmitted data values, $x_s$ from the received signal $y_s$ by assuming the noise vector z is zero. As another example, the receiving device 400 includes one or more of: a deinterleaver that rearranges scattered bits and restores the proper bit sequence, an analog RF front end that performs frequency downconversion, various filters, power amplifiers, and so on, in some embodiments.

In various embodiments, different components and/or processors of the receive processor 400 are implemented as hardware, a processor executing software instructions, a processor implementing firmware instructions, or some combination thereof. For example, some or all of the components are custom integrated circuits, application-specific integration circuits (ASICs), etc., communicatively coupled by electrical busses. In this case, in some embodiments, the receive processor 400 includes bypass busses (not shown) to bypass some of the components if the currently active MIMO mode does not require certain operations, such as processing multiple presentations of a symbol encoded according to a space-time encoding scheme.

With continued reference to FIG. 4, generally speaking, in order to calculate the likelihood values $L(b_{s,1})$, $L(b_{s,2}), \ldots, L(b_{s,W})$ for the received symbols, the multi-stream demodulator 442 calculates a log-likelihood ratio (LLR) for each bit $b_{s,1}, b_{s,2}, \ldots, b_{s,W}$, in an embodiment. The LLR of a given bit $b_{s,n}$ is an indication of whether the bit $b_{s,n}$ is more likely to be 1 or 0. In an embodiment, the LLR of a given bit $b_{s,n}$ is calculated as follows:

$$L(b_{s,n}) = \log\left(\frac{P\{y \mid b_{s,n} = 1\}}{P\{y \mid b_{s,n} = 1\}}\right) = \log(P\{y \mid b_{s,n} = 1\}) - \log(P\{y \mid b_{s,n} = 0\}) \quad (1)$$

where $P\{y|b_{s,n}=0\}$ is the probability that the bit $b_{s,n}$ is equal to 0 and $P\{y|b_{s,n}=1\}$ is the probability that the bit $b_{s,n}$ is equal to 1. If the calculated $L(b_{s,n})$ is a relatively large positive number, the probability that the bit $b_{s,n}$ is equal to 1 is greater than the probability that the bit $b_{s,n}$ is equal to 0, and the decoder 444 therefore concludes that bit $b_{s,n}$ is equal to 1, in an embodiment. On the other hand, if the calculated $L(b_{s,n})$ is a large negative number, the probability that the bit $b_{s,n}$ is equal to 0 is greater than the probability that the bit $b_{s,n}$ is equal to 1, and the decoder 444 therefore concludes that bit $b_{s,n}$ is equal to 0, in an embodiment. In at least some embodiments, if the calculated $L(b_{s,n})$ is neither a large positive number nor a large negative number, the decoder 444 performs additional processing to estimate the value of bit $b_{s,n}$. As explained above, the receive processor 400 receives more than one representation of bit $b_{s,n}$, e.g., via different ones of receive antennas, in some embodiments. Accordingly, the decoder 444 uses multiple LLRs corresponding to multiple representations of the same bit $b_{s,n}$ to estimate the value of bit $b_{s,n}$, in at least some such embodiments.

In an embodiment, the multi-stream demodulator 442 estimates the probability that bit $b_{s,n}$ is equal to 1 and the probability that bit $b_{s,n}$ is equal to 0 based on the following equations:

$$P\{y \mid b_{s,n} = 1\} = \sum_{x \in X_{s,n}^{(1)}} \exp\left(-\frac{\|y - Hx\|^2}{\sigma_z^2}\right) \quad (2)$$

$$P\{y \mid b_{s,n} = 0\} = \sum_{x \in X_{s,n}^{(0)}} \exp\left(-\frac{\|y - Hx\|^2}{\sigma_z^2}\right) \quad (3)$$

where, as in equation (1), x is a vector of estimated transmitted symbols $x_1, x_2, \ldots, x_S$, $x \in X_{s,n}^{(1)}$) is a set of all possible data symbols $x_s$ with bit $b_{s,n}$ equal to 1, $x \in X_{s,n}^{(0)}$ is a set of all possible data symbols $x_s$ with bit $b_{s,n}$ equal to 0, y represents, in vector form, received symbols $y_1, y_2, \ldots, y_{N_R}$, H represents a MIMO communication channel, and $\sigma_z$ represents variance of noise.

Combining equations (1)-(3), the LLR of a given bit $b_{s,n}$ in a given stream s can be calculated as:

$$L(b_{s,n}) = \log\left(\sum_{x \in X_{s,n}^{(1)}} \exp\left(-\frac{\|y - Hx\|^2}{\sigma_z^2}\right)\right) - \log\left(\sum_{x \in X_{s,n}^{(0)}} \exp\left(-\frac{\|y - Hx\|^2}{\sigma_z^2}\right)\right) \quad (4)$$

In an embodiment, equation (4) is approximated as:

$$L(b_{s,n}) = \frac{1}{\sigma_z^2}\left[\min_{x \in X_{s,n}^{(0)}} \|y - Hx\|^2 - \min_{x \in X_{s,n}^{(1)}} \|y - Hx\|^2\right] \quad (5)$$

Accordingly, in this embodiment, the LLR of a given bit $b_{s,n}$ is calculated based on the distances $\|y-Hx\|^2$. More specifically, the LLR of a given bit $b_{s,n}$ is calculated based on the difference between the smallest distance $\|y-Hx\|^2$ for a set of all possible data symbols $x_s$ with $b_{s,n}$ equal to 0 and the smallest distance $\|y-Hx\|^2$ for a set of all possible data symbols $x_s$ with $b_{s,n}$ equal to 1, in this embodiment.

Calculating the LLR of a given bit $L(b_{s,n})$ in accordance with equation (5) requires a calculation of $\|y-Hx\|^2$ for every constellation point in the constellation set in order to determine the smallest distance. Moreover, if there are multiple streams, a calculation of $\|y-Hx\|^2$ is required for every constellation point for every stream. Therefore, if a receiving device receives S streams, for example, and each stream is represented by W bits and modulated using an M-QAM scheme (where $M=2^W$), the receiving device will need to perform $M^S$ calculations of $\|y-Hx\|^2$ to demodulate the received S streams in accordance with equation (5).

In practice, it is burdensome for a receiving device to calculate $\|y-Hx\|^2$ for every constellation point and for every stream, in at least some scenarios. As the number of streams S and/or the number of bits W in a data symbol increases (i.e., as M increases), performing these calculations may require escalating complexity on the receiving device (e.g., more, larger, and/or more expensive processing modules and/or components). Performing these calculations may also leads to an increase in processing time. Accordingly, in order to reduce complexity, it is advantageous to utilize a demodulation technique that performs fewer than $M^S$ calculations of $\|y-Hx\|^2$ when calculating LLRs for received data corresponding to multiple streams, while maintaining performance that is similar to performance that can be achieved in a system in which $M^S$ calculations of $\|y-Hx\|^2$ are performed when calculating LLRs.

In an embodiment, to decrease the complexity of LLR calculation, hard decisions are used for one or more of the streams, and distances are calculated for the remaining one or more spatial streams using the hard decisions made for the first set of the one or more spatial streams. For example, in an embodiment, in order to calculate LLRs for a data symbol corresponding to a particular spatial stream s, a received data symbol vector x is split into two parts $x=\lfloor x^1 \; x^2 \rfloor$, where $x_s \in x^1$. That is, $x^1$ is the received data symbol that corresponds to the particular spatial stream s. The channel matrix H is split into two parts accordingly. That is the channel matrix is split into two parts $H=\lfloor H^1 \; H^2 \rfloor$, where $H^1$ is the vector that corresponds to the particular spatial stream s. The, the distance $\|y-Hx\|^2$ can be written as $$\|y-Hx\|^2 = \|y-H^1x^1-H^2x^2\|^2 = \|y'-H^2x^2\|^2 \quad (6)$$

where $y^1=y-H^1x^1$. For a given value of $x^1$, the minimum of $\|y^1-H^2x^2\|$ is determined or approximated using a hard decision determined of $x^2$ based in the given value of $x^1$. Thus, the minimum distance can be determined according to $$D(\tilde{x}^1) = \min_{given \, \tilde{x}^1} \|y - Hx\|^2 \cong \|y' - H^1\tilde{x}^1 - H^2\tilde{x}^2\|^2 \quad (7)$$

where $\tilde{x}^2$ denotes the hard decision obtained based on a given $\tilde{x}^1$.

Generally, in an embodiment, the receiving device calculates respective distances $D(\tilde{x}^1)$, according to equation (7), for each possible value of $\tilde{x}^1$, selects a minimum distance from among the calculated distances, and calculates the LLRs for the corresponding bits using the selected minimum distance. Various techniques are used for determining hard decisions for $\tilde{x}^2$ for given values of $\tilde{x}^1$, in various embodiments. For example, hard decisions are determined using slicing techniques such as zero forcing (ZF) equalizing or minimum mean-square error (MMSE) equalizing, in various embodiments. As another example, in another embodiment, hard sphere decoding is used. As yet another example, as will be explained in more detail below, in another embodiment, QR decomposition of equation (7) is performed to separate distance terms, and then slicing is used for each of the separated distance terms.

For example, the receiving device performs QR decomposition of the channel matrix H, in an embodiment. In this embodiment, the receiving device could uses the following or similar model:

$$\tilde{y}=Q^*y=Q^*Hx+Q^*z=Rx+\tilde{z} \quad (8)$$

where * denotes a complex conjugate.

The model (8) has a similar form as the $y=Hx+z$ model, except that the matrix R is an upper triangular matrix. Q matrix is a unitary matrix and the R matrix is an upper triangular matrix. As an example, in an embodiment with three spatial streams, the matrix R is represented as $$R = \begin{bmatrix} r_{11} & r_{12} & r_{13} \\ 0 & r_{22} & r_{23} \\ 0 & 0 & r_{33} \end{bmatrix}.$$

This feature of the matrix R further lowers the complexity of demodulation techniques described herein because the computations at the elements of zero in R are not required. Similar to a QR decomposition technique, other linear processing techniques are applied to y in some other embodiments.

In an embodiment, instead of calculating squared distance $\|y-Hx\|^2$ for all combinations of data symbols corresponding to multiple spatial streams, the squared distance $\|y-Hx\|^2$ for data symbols in a first group of data symbols is calculated for only those data symbols in a second group of data symbols that at least substantially minimize that square distance. For example, in an embodiment, the first group of data symbols comprises the data symbol $x_1$ corresponding to a first spatial stream and the second group of data symbols comprises data symbols $x_2-x_{ss}$ corresponding to the remaining spatial streams. Generally speaking, in an embodiment, the multi-stream demodulator 442 estimates data values corresponding to the data symbols $x_2-x_{ss}$ for each possible value of $x_1$ using a hard-decision technique to obtain a plurality of data symbol combinations $[x_1, x_2, \ldots, x_{ss}]$. The multi-stream demodulator 442 then calculates the squared distance $\|y-Hx\|^2$ for each of the plurality of data symbol combinations $[x_1, x_2, \ldots, x_{ss}]$, and selects a combination $[x_1, x_2, \ldots, x_{ss}]$ that results in a minimum distance.

As discussed above, using hard decisions for one or more of the streams reduces complexity of calculation of LLRs, in embodiments. However, using hard decisions for one or more of the spatial streams also reduces the performance of the multi-stream demodulator 442 and, consequently, reduces performance of the receive processor 400, in at least some situations. In an embodiment, performance of the multi-stream demodulator 442 is improved by progressively optimizing hard decisions initially obtained by the multi-stream demodulator 442. Generally speaking, and as will be explained in more detail below, progressive optimization for a hard decision obtained for a first spatial stream is performed by progressively refining the hard decision using hard decisions obtained for one or more second spatial streams, in an embodiment.

In an embodiment, estimating data values corresponding to the data symbols $x_2$–$x_{ss}$ for each possible value of $x_1$ includes performing one or more iterations of refining estimated data values for at least one of the data symbols $x_2$–$x_{ss}$ based on estimated data values for the other transmitted data symbols $x_2$–$x_{ss}$. As just an example, in an embodiment with three spatial streams, to calculate a minimum distance $\|y-Hx\|^2$ for the data symbol $x_1$ corresponding to the first spatial stream, the multi-stream demodulator 442 estimates, for a particular possible data value of $x_1$, data values of the data symbols $x_2$ and $x_3$ corresponding to the second spatial stream and the third spatial stream, respectively. For example, in an embodiment, the demodulator 442 performs QR decomposition of the channel matrix H, as discussed above, to obtain the distance $$D(x_1,x_2,x_3)=T1(x_1)+T2(x_1,x_2)+T3(x_1,x_2,x_3) \quad (9)$$

or, alternatively, $$D(x_1,x_2,x_3)=T1(x_1)+T2'(x_1,x_3)+T3'(x_1,x_3,x_2) \quad (10)$$

where, referring for example to equation (9), $T1(x_1)=|z_1-r_{11}x_1|^2$, $T2(x_2,x_3)=|z_2-r_{22}x_2-r_{23}x_3|^2$, and $T3(x_1,x_2,x_3)=|z_3-r_{33}x_3-r_{32}x_2-r_{31}x_1|^2$ With continued reference to equation (9), for a given possible data value of $x_1$, the demodulator 442 (e.g., the hard decision generator 452) estimates the data value corresponding to $x_2$ based on $T_2$ using the given value of $x_1$, and estimates the data value of to $x_3$ based on $T_3$ using the given value of $x_1$, and the estimated value of $x_2$. Upon obtaining the initial estimates of data values of $x_2$ and $x_3$, the demodulator 442 (e.g., the progressive optimizer 452) performs one or more refining iterations to refine or optimize the estimate of at least one of the estimated data values of $x_2$ and $x_3$ based on (i) the estimated data value of the other one of $x_2$ and $x_3$ and (ii) the given possible data value of $x_1$. Thus, for example, the demodulator 442 performs one or more iterations of (i) calculating a refined estimate of the data value of $x_3$ based on the given possible data value of $x_1$ and an estimated data value of $x_2$, (ii) calculating a refined estimate of the data value of $x_2$ based on the given possible data value of $x_1$ and an estimated data value of $x_3$, (iii) calculating a refined estimate of the data value of $x_3$ based on the given possible data value of $x_1$ and an estimated data value of $x_2$, and so on, in an embodiment. In an embodiment, in the first iteration of one or more iterations, the modulator 442 utilizes the initial estimated data value of $x_2$ to calculate a refined estimated value of $x_3$ and utilizes the initial estimated data value of $x_3$ to calculate a refined estimated value of $x_2$. Then, if the modulator 442 performs more than one iteration, the modulator 442 utilizes the refined estimated data value of $x_2$ obtained in the previous iteration to calculate a new refined estimated value of $x_3$ and utilizes the refined estimated data value of $x_3$ obtained in the previous iteration to calculate a new refined estimated value of $x_2$, in an embodiment. Accordingly, the one or more refining iterations progressively refine or optimize the initial estimates of the data values of $x_2$ and $x_3$ for the given possible data value of $x_1$, in an embodiment.

In an embodiment, upon obtaining the refined estimated data values of $x_2$ and $x_3$ obtained in the final iteration of the one or more iterations, the demodulator 442 calculates the distance $D(x_1, x_2, x_3)$ using the given possible data value of $x_1$ and the obtained refined estimated data values of $x_2$ and $x_3$. According to an embodiment, the demodulator 442 repeats the process of obtaining initial estimated data values of $x_2$ and $x_3$, refining the initial estimated data values of $x_2$ and $x_3$, and calculating the distance $D(x_1, x_2, x_3)$ as described above for each of the other possible data values of $x_1$. The demodulator 442 then selects a minimum distance of the calculated distances $D(x_1, x_2, x_3)$, and calculates LLRs for the bits of the data symbol $x_1$ using the triplet $(x_1, x_2, x_3)$ corresponding to the selected minimum distance, in an embodiment.

In some embodiments, the demodulator 442 (e.g., the hard decision generator 452) determines multiple candidate initial estimated data values of $x_2$ (e.g., obtained by slicing), and determines initial estimated data values of $x_3$ based on each of the multiple candidate estimated data values of $x_2$. According to an embodiment, the demodulator 442 then determines refined estimated data values for each of the multiple candidate initial estimated data values of $x_2$ and for each initial estimated data values of $x_3$ by performing one or more refining iterations as described above, in an embodiment. The modulator 442 then calculates distances $D(x_1, x_2, x_3)$ using the obtained refined estimated data values of $x_2$ and $x_3$ determined for each of the multiple initial estimated data values of $x_2$ and $x_3$, and selects a minim distance of the calculated multiple distances $D(x_1, x_2, x_3)$ obtained for the multiple refined estimated data values of $x_2$ and $x_3$ for the given possible data value of $x_1$. Upon obtaining multiple distances for each possible data value of $x_1$, the demodulator 442 selects a minimum distance, and calculates LLRs using the triplet $(x_1, x_2, x_3)$ corresponding to the selected minimum distance. Obtaining multiple distances for each possible data value of $x_1$ using multiple estimate values of $x_2$, $x_3$ improves accuracy of LLR calculations and, accordingly, performance of the demodulator 442, in at least some embodiments.

For example, in an embodiment with three spatial streams, LLRs for three symbols are calculated using the following, or similar, equations:

$$L(b_{1,n}) \approx \frac{1}{\sigma_z^2}\left[\min_{x_1 \in \hat{x}_{1,n}^{(0)},x_3}\left(\min_{x_2}\|y-Hx\|^2\right) - \min_{x_1 \in \hat{x}_{1,n}^{(1)},x_3}\left(\min_{x_2}\|y-Hx\|^2\right)\right] \quad (11)$$

$$L(b_{2,n}) \approx \frac{1}{\sigma_z^2}\left[\min_{x_2 \in \hat{x}_{2,n}^{(0)},x_3}\left(\min_{x_1}\|y-Hx\|^2\right) - \min_{x_2 \in \hat{x}_{2,n}^{(1)},x_3}\left(\min_{x_1}\|y-Hx\|^2\right)\right] \quad (12)$$

$$L(b_{3,n}) \approx \frac{1}{\sigma_z^2}\left[\min_{x_3 \in \hat{x}_{3,n}^{(0)},x_2}\left(\min_{x_1}\|y-Hx\|^2\right) - \min_{x_3 \in \hat{x}_{3,n}^{(1)},x_2}\left(\min_{x_1}\|y-Hx\|^2\right)\right] \quad (13)$$

where $\tilde{X}_{1,n}^{(b)}$ is a set of all possible data symbols of the first stream $x_1$ with $b_{1,n}=b$, $\tilde{X}_{2,n}^{(b)}$, is a set of all possible data symbols of the second stream $x_2$ with $b_{2,n}=b$, and $\tilde{X}_{3,n}^{(b)}$ is a set of all possible data symbols of the third stream $x_3$ with $b_{3,n}=b$, where b is equal to either 1 or 0. Accordingly, LLRs for bits in the second and third streams $x_2$, $x_3$, for example, are calculated by calculating the minimum squared distance $$\min_{x_1} \|y - Hx\|^2$$

for every possible set $(x_2, x_3)$, in an embodiment. Thus, the squared distance $\|y-Hx\|^2$ for a given set $(x_2, x_3)$ is calculated only for the $x_1$ that at least substantially minimizes the squared distance, in this embodiment.

More specifically, when the demodulator 442 receives a data symbol vector y including three streams (where the streams may be received at a substantially the same time, via multiple spatial streams, for example), the demodulator 442 determines the optimum symbol $\hat{x}_1$ (i.e., the optimum data value of $x_1$) that at least substantially minimizes the squared distance $\|y-Hx\|^2$ for a given combination of $x_2$ and $x_3$. In an embodiment, $\hat{x}_1$ is determined using the following, or a similar equation:

$$\begin{aligned}\hat{x}_1 &= \operatorname*{argmin}_{x_1}\left\|y - H\begin{bmatrix}x_1\\x_2\\x_3\end{bmatrix}\right\|^2 \\ &= \operatorname*{argmin}_{x_1}\|\tilde{y} - h_1 x_1\|^2 \\ &= \operatorname*{argmin}_{x_1}\left|\frac{h_1^H \tilde{y}}{\|h_1\|^2} - x_1\right|^2\end{aligned} \quad (14)$$

where $\tilde{y}=y-h_2 x_2-h_3 x_3$.

Although the multi-stream demodulation techniques are described in conjunction with an example embodiment with three spatial streams, such multi-stream demodulation techniques is applied to other suitable numbers (e.g., 4, 5, 6, 7, 8, etc.) of spatial streams. As just an example, in an embodiment with four spatial streams, to calculate a minimum distance $\|y-Hx\|^2$ for the data symbol $x_1$ corresponding to the first spatial stream, the multi-stream demodulator 442 begins by estimating, for a particular possible data value of $x_1$, data values of the data symbols $x_2$, $x_3$, and $x_4$, corresponding to the second spatial stream, the third spatial stream, and the fourth spatial stream, respectively. For example, in an embodiment, the demodulator 442 performs QR decomposition of the distance $D(x_1, x_2, x_3, X_4)$ to obtain $$D(x_1,x_2,x_3,x_4)=T1(x_1)+T2(x_1,x_2)+T3(x_1,x_2,x_3)+T4(x_1,x_2,x_3,x_4) \quad (15)$$

or alternatively, $$D(x_1,x_2,x_3,x_4)=T1(x_1)+T2'(x_1,x_3)+T3'(x_1,x_3,x_4)+T4'(x_1,x_3,x_4,x_2) \quad (16)$$

or alternatively, $$D(x_1,x_2,x_3,x_4)=T1(x_1)+T2(x_1,x_2)+T3''(x_1,x_2,x_4)+T4''(x_1,x_2,x_4,x_3) \quad (17)$$

In an embodiment, using for example equation (15), for a given possible data value of $x_1$, the demodulator 442 (e.g., the hard decision generator 452) estimates the data value corresponding to $x_2$ based on $T_2$ and using the given value of $x_1$, estimates the data value of to $x_3$ based on T3 using the given value of $x_1$ the estimated data value of $x_2$, and estimates the data value of to $x_4$ based on $T_4$ using the given value of $x_1$ and the estimated values of $x_2$ and $x_3$. Upon obtaining the initial estimates of data values of $x_2$, $x_3$, and $x_4$, the demodulator 442 (e.g., the progressive optimizer 454) performs one or more refining iterations to refine or optimize the estimate of at least one of the estimated data values of $x_2$, $x_3$, and $x_4$ based on the estimated data value of the other ones of $x_2$, $x_3$, and $x_4$ and the given possible data value of $x_1$. Thus, for example, the demodulator 442 performs one or more iterations of (i) calculating a refined estimate of the data value of $x_4$ based on the given possible data value of $x_1$ and an estimated data values of $x_2$ and $x_3$, (ii) calculating a refined estimate of the data value of $x_2$ based on the given possible data value of x1 and the estimated data values of $x_3$ and $x_4$, (iii) calculating a refined estimate of the data value of $x_3$ based on the given possible data value of $x_1$ and an estimated data value of $x_2$ and $x_4$, (iv) calculating a refined estimate of the data value of $x_4$ based on the given possible data value of $x_1$ and an estimated data values of $x_2$ and $x_3$, and so on, in an embodiment. In an embodiment, in the first iteration of one or more iterations, the modulator 442 utilizes the initial estimated data values of $x_2$ and $x_3$ to calculate a refined estimated value of $x_4$, utilizes the initial estimated data values of $x_3$ and $x_4$ to calculate a refined estimated value of $x_2$, and utilizes the initial estimated data values of $x_2$ and $x_4$ to calculate a refined estimated value of $x_3$. Then, if more than one iteration is to be performed, the modulator 442 utilizes the refined estimated data values of $x_2$ and $x_3$ obtained in the previous iteration to calculate a new refined estimated value of $x_4$, utilizes the refined estimated data values of $x_3$ obtained in the previous iteration to calculate a new refined estimated value of $x_2$, in an embodiment. Accordingly, the one or more refining iterations progressively refine or optimize the initial estimates of the data values of $x_2$, $x_3$, $x_4$ for the given possible data value of $x_1$, in an embodiment.

In an embodiment, upon obtaining the refined estimated data values of $x_2$, $x_3$, and $x_4$ in the final iteration of the one or more iterations, the demodulator 442 calculates the distance $D(x_1, x_2, x_3, X_4)$ using the given possible data value of $x_1$ and the obtained refined estimated data values of $x_2$, $x_3$, and $x_4$. The demodulator 442 then repeats the process of obtaining initial estimated data values of $x_2$, $x_3$ and $x_4$, refining the initial estimated data values of $x_2$, $x_3$, and $x_4$, and calculating the distance $D(x_1, x_2, x_3, X_4)$ as described above for each of the other possible data values of x1. The demodulator 442 then selects a minimum distance of the calculated distances $D(x_1, x_2, x_3, X_4)$ and calculates LLRs for the bits of the data symbol x1 using the triplet $(x_1, x_2, x_3, X_4)$ corresponding to the selected minimum distance, in an embodiment.

In some embodiments, the demodulator 442 determines multiple candidate initial estimated data values of $x_2$ (e.g., obtained by slicing), determines initial estimate data values of $x_3$ based on each of the multiple candidate estimated data values of $x_2$, and determines initial estimate data values of $x_4$ based on each of the multiple candidate estimated data values of $x_2$ and each of the multiple determined data values of $x_3$. The demodulator 442 then determines refined estimated data values for each of the multiple candidate initial estimated data values of $x_2$, each initial estimated data values of $x_3$ and each of the initial estimate data values of $x_4$ by performing one or more refining iterations as described above, in an embodiment. The modulator 442 calculates distances $D(x_1, x_2, x_3, x_4)$ using the obtained refined estimated data values of $x_2$, $x_3$ and $x_4$ determined for each of the multiple initial estimated data values of $x_2$, $x_3$ and $x_4$, and selects a minim distance of the calculated multiple distances $D(x_1, x_2, x_3, x_4)$ obtained for the multiple refined estimated data values of $x_2$, $x_3$ and $x_4$ for the given possible data value of $x_1$. Upon obtaining multiple distances for each possible data value of $x_1$, the demodulator 442 selects a minimum distance, and calculates LLRs using the triplet $(x_1, x_2, x_3, x_4)$ corresponding to the selected minimum distance in manner similar to LLR calculation described above with respect to the example embodiment with three spatial streams. Similar to the example embodiment with three spatial streams, obtaining multiple distances for each possible data value of $x_1$ using multiple estimate values of $x_2$, $x_3$ and $x_4$ improves accuracy of LLR calculations and, accordingly, performance of the demodulator 442, in at least some embodiments.

Figure 5:
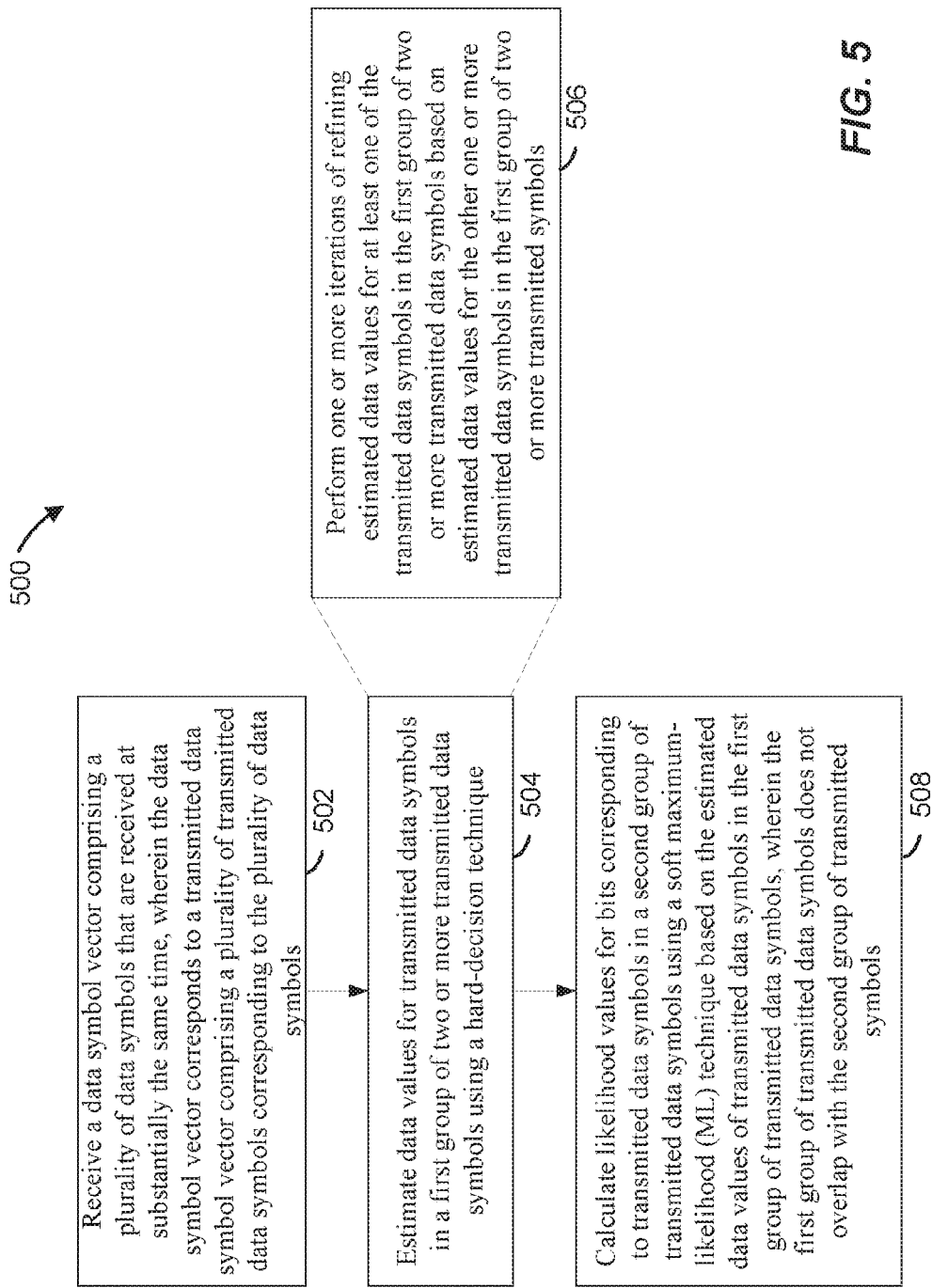
FIG. 5 is a flow diagram of an example method for communicating in a wireless communication network, according to an embodiment.

FIG. 5 is a flow diagram of an example method for communicating in a wireless communication network, according to an embodiment. For ease of explanation, the method 500 is described with reference to FIGS. 1, 2A, 2B and 4. However, the method 500 is utilized with systems and devices other than those illustrated in FIGS. 1, 2A, 2B and 4, in some embodiments.

At block 502, a data symbol vector y including S symbols is received. The S symbols are received at a substantially the same time, in an embodiment. In an embodiment, the data symbol vector corresponds to a transmitted data symbol vector comprising a plurality of transmitted data symbols corresponding to the plurality of data symbols.

At block 504, data values for transmitted data symbols in a first group of two or more transmitted data symbols are estimated using a hard-decision technique. For example the data values for the transmitted data symbols in the first group of two or more transmitted data symbols are estimated using slicing or using any other suitable hard decision technique. Block 504 includes block 506. At block 506, one or more refining iterations are performed. The one or more refining iterations refine estimated data values for at least one of the transmitted data symbols in the first group of two or more transmitted data symbols based on estimated data values for the other one or more transmitted data symbols in the first group of two or more transmitted symbols.

At block 508, likelihood values for bits corresponding to transmitted data symbols in a second group of transmitted data symbols are calculated using a soft maximum-likelihood (ML) technique. The likelihood values for bits corresponding to transmitted data symbols in the second group of transmitted data symbols are calculated based on the estimated data values of transmitted data symbols in the first group of transmitted data symbols. In an embodiment, the first group of transmitted data symbols does not overlap with the second group of transmitted symbols. As just an example, in an embodiment, the first group of transmitted data symbols includes a first transmitted data symbol, and the second group of transmitted data symbols includes at least a second data symbol and a third data symbol, wherein the first data symbol is a data symbol other than the second data symbol and the third data symbol. In another embodiment, the first group of data symbols and the second group of data symbols include respective non-overlapping sets of multiple data symbols.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:

receiving, at a communication device, a data symbol vector comprising a plurality of data symbols that are received at substantially the same time, wherein the data symbol vector corresponds to a transmitted data symbol vector comprising a plurality of transmitted data symbols corresponding to the plurality of data symbols;

estimating, at the communication device, data values for transmitted data symbols in a first group of two or more transmitted data symbols using a hard-decision technique, including performing one or more iterations of refining estimated data values for at least one of the transmitted data symbols in the first group of two or more transmitted data symbols based on estimated data values for the other one or more transmitted data symbols in the first group of two or more transmitted data symbols; and calculating, at the communication device, likelihood values for bits corresponding to transmitted data symbols in a second group of transmitted data symbols using a soft maximum-likelihood (ML) technique based on the estimated data values of transmitted data symbols in the first group of transmitted data symbols, wherein the first group of transmitted data symbols does not overlap with the second group of transmitted symbols.

2. The method of claim 1, wherein:

estimating data values for transmitted data symbols in the first group of transmitted data symbols using the hard-decision technique comprises determining respective data values corresponding to the transmitted data symbols in the first group of transmitted data symbols particular data values corresponding to the transmitted data symbols in the second group of transmitted data symbols, and calculating likelihood values for bits in the second group of transmitted data symbols comprises calculating the likelihood values based at least in part on the respective data values corresponding to the transmitted data symbols in the first group of transmitted data symbols.

3. The method of claim 2, wherein the respective data values substantially minimize a distance value corresponding to a squared distance between the data symbol vector and a channel matrix H multiplied with a vector including the first group of transmitted data symbols and the second group of transmitted data symbols.

4. The method of claim 2, further comprising calculating the distance value corresponding to the respective data values, and wherein calculating likelihood values for bits in the second group of transmitted data symbols comprises calculating likelihood values for bits in the second group of transmitted data symbols based at least in part on the calculated distance value corresponding to the respective data values.

5. The method of claim 4, wherein the first group of transmitted data symbols comprises a transmitted data symbol ($x_1$) and the second group of transmitted data symbols comprises transmitted data symbols ($x_2, \ldots, x_S$), and wherein determining the suitable bit sequence $$\begin{bmatrix} \hat{x}_1 \\ \vdots \\ \hat{x}_K \end{bmatrix}$$

comprises calculating:

$$\begin{bmatrix} \hat{x}_1 \\ \vdots \\ \hat{x}_s \end{bmatrix} = \underset{x_1}{\operatorname{argmin}} \left\| y - H \begin{bmatrix} x_1 \\ \vdots \\ x_S \end{bmatrix} \right\|^2 = \underset{x_1}{\operatorname{argmin}} \left\| \tilde{y} - [\, h_1 \ h_2 \ldots h_k \,] \begin{bmatrix} x_1 \\ \vdots \\ x_K \end{bmatrix} \right\|^2$$

where $$\tilde{y} = y - \sum_{i=2}^{s} h_i x_i.$$

6. The method of claim 5, wherein calculating the distance value corresponding to the respective data values $$\hat{x} = \begin{bmatrix} \hat{x}_1 \\ \vdots \\ \hat{x}_s \end{bmatrix}$$

comprises calculating:

$$\min_{x_1} \| \tilde{y} - Hx \|^2 = \left\| \tilde{y} - [\, h_1 \ h_2 \ldots h_k \,] \begin{bmatrix} \hat{x}_1 \\ \vdots \\ \hat{x}_s \end{bmatrix} \right\|^2.$$

7. The method of claim 1, wherein the hard-decision technique is selected from a group including: a sphere decoding technique, a zero-forcing decoding technique, a minimum mean-squared error (MMSE) decoding technique.

8. The method of claim 1, wherein
the transmitted data symbols in the first group of two or more transmitted data symbols correspond to data symbols transmitted using a first set spatial streams in a multiple input multiple output (MIMO) communication channel, and
the transmitted data symbols in the second group of one or more transmitted data symbols correspond to data symbols transmitted using a second set of spatial streams in the MIMO communication channel, wherein the first set of spatial streams does not overlap with the second set of spatial streams.

9. The method of claim 1, wherein estimating data values for transmitted data symbols in a first group of two or more transmitted data symbols using the hard-decision technique includes performing QR decomposition of a channel matrix corresponding to the MIMO communication channel.

10. The method of claim 1, wherein calculating likelihood values comprises calculating log-likelihood ratios (LLRs).

11. The method of claim 1, further comprising decoding at least some of the data symbols in the received data symbol vector based at least in part on the calculated likelihood values.

12. An apparatus for communicating in a wireless communication network, the apparatus comprising one or more integrated circuits configured to
receive a data symbol vector comprising a plurality of data symbols that are received at substantially the same time, wherein the data symbol vector corresponds to a transmitted data symbol vector comprising a plurality of transmitted data symbols correspond to the plurality of data symbols,
estimate data values for transmitted data symbols in a first group of two or more transmitted data symbols using a hard-decision technique, including performing one or more iterations of refining estimated data values for at least one of the transmitted data symbols in the first group of two or more transmitted data symbols based on estimated data values for the other one or more transmitted data symbols in the first group of two or more transmitted symbols, and
calculate likelihood values for bits in a second group of transmitted data symbols using a soft maximum-likelihood (ML) technique based on the estimated data values of transmitted data symbols in the first group of transmitted data symbols, wherein the first group of transmitted data symbols does not overlap with the second group of transmitted symbols.

13. The apparatus of claim 12, wherein the one or more integrated circuits are configured to
estimate data values for transmitted data symbols in the first group of transmitted data symbols using the hard-decision technique at least by determining respective data values corresponding to the transmitted data symbols in the first group of transmitted data symbols particular data values corresponding to the transmitted data symbols in the second group of transmitted data symbols, and
calculate likelihood values for bits in the second group of transmitted data symbols comprises calculating the likelihood values based at least in part on the respective data values corresponding to the transmitted data symbols in the first group of transmitted data symbols.

14. The apparatus of claim 13, wherein the respective data values substantially minimize a distance value corresponding to a squared distance between the data symbol vector and a channel matrix H multiplied with a vector including the first group of transmitted data symbols and the second group of transmitted data symbols.

15. The apparatus of claim 13, wherein the one or more integrated circuits are further configured to
calculate the distance value corresponding to the respective data values, and
calculate likelihood values for bits in the second group of transmitted data symbols based at least in part on the calculated distance value corresponding to the respective data values.

16. The apparatus of claim 15, wherein the first group of transmitted data symbols comprises a transmitted data symbol ($x_1$) and the second group of transmitted data symbols comprises transmitted data symbols ($x_2, \ldots, x_S$), and the multi-stream demodulator is configured to calculate the data values $$\begin{bmatrix} \hat{x}_1 \\ \vdots \\ \hat{x}_K \end{bmatrix}$$

according to $$\begin{bmatrix} \hat{x}_1 \\ \vdots \\ \hat{x}_s \end{bmatrix} = \operatorname*{argmin}_{x_1} \left\| y - H \begin{bmatrix} x_1 \\ \vdots \\ x_S \end{bmatrix} \right\|^2 = \operatorname*{argmin}_{x_1} \left\| \tilde{y} - [h_1 \ h_2 \ldots h_K] \begin{bmatrix} x_1 \\ \vdots \\ x_K \end{bmatrix} \right\|^2$$

where $$\tilde{y} = y - \sum_{i=2}^{s} h_i x_i.$$

17. The apparatus of claim 15, wherein the one or more integrated circuits are configured to calculate the distance value corresponding to the respective data values $$\hat{x} = \begin{bmatrix} \hat{x}_1 \\ \vdots \\ \hat{x}_s \end{bmatrix}$$

according to $$\min_{x_1} \|\tilde{y} - Hx\|^2 = \left\| \tilde{y} - [h_1 \ h_2 \ldots h_K] \begin{bmatrix} \hat{x}_1 \\ \vdots \\ \hat{x}_s \end{bmatrix} \right\|^2.$$

18. The apparatus of claim 12, wherein the hard-decision technique is selected from a group including: a sphere decoding technique, a zero-forcing decoding technique, a minimum mean-squared error (MMSE) decoding technique.

19. The apparatus of claim 12, wherein
the transmitted data symbols in the first group of two or more transmitted data symbols correspond to data symbols transmitted using a first set spatial streams in a multiple input multiple output (MIMO) communication channel, and
the transmitted data symbols in the second group of one or more transmitted data symbols correspond to data symbols transmitted using a second set of spatial streams in the MIMO communication channel, wherein the first set of spatial streams does not overlap with the second set of spatial streams.

20. The apparatus of claim 12, wherein the one or more integrated circuits are further configured to
perform QR decomposition of a channel matrix H corresponding to the MIMO communication channel to obtain a unitary matrix Q and an upper triangular matrix R, and
estimate data values for transmitted data symbols in the first group of two or more transmitted data symbols using the unitary matrix Q obtained from QR decomposition of the channel matrix H.

21. The apparatus of claim 12, wherein the one or more integrated circuits are configured to calculating likelihood values at least by calculating log-likelihood ratios (LLRs).

22. The apparatus of claim 12, wherein the one or more integrated circuits are further configured to decode at least some of the data symbols in the received data symbol vector based at least in part on the calculated likelihood values.

\* \* \* \* \*